(12) United States Patent
Kim et al.

(10) Patent No.: US 9,099,881 B2
(45) Date of Patent: Aug. 4, 2015

(54) METHOD AND APPARATUS FOR CHARGING OVER-DISCHARGED BATTERY IN BOOTING PROCESS

(71) Applicant: Samsung Electronics Co. Ltd., Suwon-si, Gyeonggi-do (KR)

(72) Inventors: Beomju Kim, Suwon-si (KR); Seoyoung Park, Suwon-si (KR); Jungoh Sung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 13/723,794

(22) Filed: Dec. 21, 2012

(65) Prior Publication Data
US 2013/0200857 A1    Aug. 8, 2013

(30) Foreign Application Priority Data
Feb. 3, 2012    (KR) .................. 10-2012-0011240

(51) Int. Cl.
| | |
|---|---|
| H02J 7/00 | (2006.01) |
| G06F 1/32 | (2006.01) |
| H02J 7/04 | (2006.01) |
| G06F 1/28 | (2006.01) |
| G06F 1/30 | (2006.01) |

(52) U.S. Cl.
CPC ............ *H02J 7/0052* (2013.01); *G06F 1/28* (2013.01); *G06F 1/30* (2013.01); *G06F 1/324* (2013.01); *G06F 1/3212* (2013.01); *H02J 7/0073* (2013.01); *H02J 7/041* (2013.01); *Y02B 60/1217* (2013.01); *Y02B 60/1292* (2013.01)

(58) Field of Classification Search
CPC ....... H02J 7/0052; H02J 7/0073; H02J 7/041; G06F 1/3212; G06F 1/28; G06F 1/30; G06F 1/324; Y02B 60/1292; Y02B 60/1217
See application file for complete search history.

(56) References Cited

U.S. PATENT DOCUMENTS

| | | | | | |
|---|---|---|---|---|---|
| 5,200,690 | A | * | 4/1993 | Uchida | 320/106 |
| 5,710,931 | A | * | 1/1998 | Nakamura et al. | 713/323 |
| 5,825,155 | A | * | 10/1998 | Ito et al. | 320/118 |
| 6,157,172 | A | * | 12/2000 | Niemitalo et al. | 320/139 |
| 6,534,953 | B2 | * | 3/2003 | Shirakawa | 320/114 |
| 6,553,263 | B1 | * | 4/2003 | Meadows et al. | 607/61 |
| 6,744,234 | B2 | * | 6/2004 | Odaohhara et al. | 320/100 |
| 7,012,405 | B2 | * | 3/2006 | Nishida et al. | 320/137 |
| 7,259,538 | B2 | * | 8/2007 | Melton et al. | 320/106 |
| 7,415,621 | B2 | * | 8/2008 | Odaohhara | 713/300 |
| 7,772,799 | B2 | * | 8/2010 | Wu | 320/104 |
| 7,791,319 | B2 | * | 9/2010 | Veselic et al. | 320/158 |

(Continued)

FOREIGN PATENT DOCUMENTS

EP    1 995 666 A1    11/2008

*Primary Examiner* — Naum B Levin
(74) *Attorney, Agent, or Firm* — Jefferson IP Law, LLP

(57) ABSTRACT

A method and apparatus for charging a battery of a mobile device are provided. In the apparatus, a processor of the device starts a charging process when a connection of a charger is detected after a booting process of the device is initiated. The processor adjusts electric power by performing at least one of reducing consuming power of the device and raising charging power of the device. When a completion condition of a power adjustment is satisfied, the processor returns the electric power by performing at least one of returning the reduced consuming power to a basic consuming value and returning the raised charging power to a basic charging value.

17 Claims, 8 Drawing Sheets

(56) References Cited

U.S. PATENT DOCUMENTS

| | | | |
|---|---|---|---|
| 8,284,067 B2* | 10/2012 | Yasuda et al. | 340/636.1 |
| 8,400,115 B2* | 3/2013 | Hung et al. | 320/162 |
| 2005/0194933 A1* | 9/2005 | Arnold et al. | 320/128 |
| 2007/0278990 A1* | 12/2007 | Raichle et al. | 320/104 |
| 2008/0265838 A1* | 10/2008 | Garg et al. | 320/115 |
| 2009/0267570 A1* | 10/2009 | Paunonen | 320/150 |
| 2010/0188238 A1* | 7/2010 | Yasuda et al. | 340/636.1 |
| 2011/0022826 A1 | 1/2011 | More et al. | |
| 2011/0320161 A1* | 12/2011 | Dolbec et al. | 702/132 |
| 2012/0030454 A1 | 2/2012 | Book et al. | |
| 2013/0015822 A1* | 1/2013 | Kung | 320/145 |

\* cited by examiner

METHOD AND APPARATUS FOR CHARGING OVER-DISCHARGED BATTERY IN BOOTING PROCESS

PRIORITY

This application claims the benefit under 35 U.S.C. §119(a) of a Korean patent application filed on Feb. 3, 2012 in the Korean Intellectual Property Office and assigned Serial No. 10-2012-0011240, the entire disclosure of which is hereby incorporated by reference.

BACKGROUND OF THE INVENTION

1. Field of the Invention

The present invention relates to a method and apparatus for charging a battery in a mobile device.

2. Description of the Related Art

Recently, a variety of mobile devices such as a cellular phone, a Personal Digital Assistant (PDA), a tablet terminal, or the like have been widely used. Such mobile devices have a battery for supplying electric power so as to secure their mobility. If a battery is not used for a long time, the battery may come to be in an over-discharged state. When an over-discharged battery is used in a mobile device, some problems may occur in the booting process, such as an interruption in the booting process or a failure to initiate the booting process.

When a mobile device is turned off due to a discharge of a battery, the user often uses a battery charger to charge the discharged battery of the mobile device. Since electric power is supplied from the battery charger, the user may expect that the mobile device will be stably operated.

A charging current provided to a mobile device through a Universal Serial Bus (USB) charger connected to a USB port is relatively low (about 500 mA). In contrast, a Travel Adaptor (TA) charger connected to a 220V/110V plug provides a charging current of 650 mA to 1.7 A to a mobile device. Some mobile devices, especially large-sized mobile devices, may require or consume currents more than a current supplied from the USB charger during a booting process. A charging unit (i.e., a charging circuit) of the mobile device cannot know a charged degree until a booting process is completed. If the charging unit performs a charging process based on a current of the TA charger when the USB charger is connected to the mobile device, an unexpected problem, such as a circuit fault, may occur in the USB charger. Accordingly, the charging unit performs a charging process based on a current of the USB charger before a booting process is completed, and before a charger is identified.

The following descriptions will be given on the assumption that a mobile device is connected to an over-discharged battery. A booting process is performed under the condition that a USB charger or a TA charger is connected to a mobile device. Upon failing to identify a charger, a charging unit performs a charging process based on a charging current of a USB charger. If a current needed in a booting process is greater than a current provided by a USB charger, an over-discharged battery substantially fails to provide a current. As a result, a booting process cannot be performed normally, and thereby a charging process also cannot be performed properly.

SUMMARY OF THE INVENTION

Aspects of the present invention are to address the above-mentioned problems and/or disadvantages and to offer at least the advantages described below. Accordingly, an aspect of the present invention is to provide a method and apparatus for charging a battery, especially for allowing proper charging and booting processes even in an over-discharged state.

According to an aspect of the present invention, a method for charging a battery of a mobile device is provided. The method includes starting a charging process when a connection of a charger is detected after a booting process of the device is initiated, adjusting electric power by performing at least one of reducing consuming power of the device and raising charging power of the device, and when a completion condition of a power adjustment is satisfied, returning the electric power by performing at least of one or more of returning the reduced consuming power to a basic consuming value and returning the raised charging power to a basic charging value.

According to another aspect of the present invention, an apparatus for charging a battery of a mobile device is provided. The apparatus includes a charging unit for starting a charging process when a connection of a charger is detected after a booting process of the device is initiated, and a processor for adjusting electric power by performing at least one of reducing consuming power of the device and raising charging power of the device, and for, when a completion condition of a power adjustment is satisfied, returning the electric power by performing at least one of returning the reduced consuming power to a basic consuming value and returning the raised charging power to a basic charging value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

A charger with a relatively low charging current will be referred to as a USB charger, and a charger with a relatively high charging current will be referred to as a TA charger. However, regardless of interfaces, the operation of exemplary embodiments of the present invention is determined depending on the intensity of a charging current provided by a charger, as described below.

Figure 1:
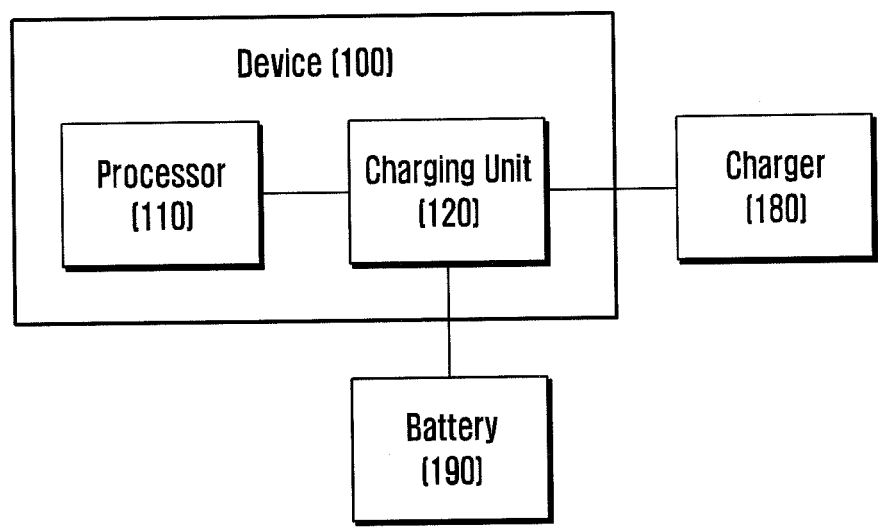
FIG. 1 is a block diagram illustrating a mobile device according to an exemplary embodiment of the present invention.

FIG. 1 is a block diagram illustrating a mobile device according to an exemplary embodiment of the present invention.

Referring to FIG. 1, the mobile device 100 includes a processor 110 and a charging unit 120. For explanation, a charger 180 and a battery 190 are shown together with the device 100. The device 100 does not need to include both the charger 180 and the battery 190. The charger 180 is generally adaptable to the device 100. The battery 190 may be integrated with the device 100 or may be detachable from the device 100.

A basic clock count of the processor 110 is determined so that the processor 110 can be operated in a normal environment. Some kinds of processors may reduce a clock count, depending on environment. For example, if a basic clock frequency is 1 GHz, a clock frequency may be reduced to 0.5 GHz in a specific environment.

A basic charging voltage of the charging unit 120 is a charging voltage provided to the device 100 and/or the battery 190 by the charging unit 120 in a normal environment. According to an exemplary embodiment of the present invention, the charging voltage of the charging unit 120 may vary depending on environment.

The processor 110 controls the operation of the device 100, such as a booting process and the execution of applications. The processor 110 according to an exemplary embodiment of the present invention may reduce a consuming power or raise charging power of the device when a connection of the charger 180 is detected after a booting process is initiated. For example, when a connection of the device 100 is detected, the processor 110 may reduce consuming power of the device 100 by setting an operation clock count of the processor 110 to a smaller value than a basic clock count. Additionally, when a connection of the charger 180 is detected, the processor 110 may raise the charging power of the device 100 by setting a charging voltage of the charging unit 120 to a higher value than a basic charging voltage.

When a completion condition of a power adjustment is satisfied, the processor 110 may return adjusted values of the charging power and/or consuming power to basic values. For example, if an operation clock count of the processor 110 is set to a smaller value than a basic clock count, the processor 110 may return consuming power to a basic value by setting the operation clock count of the processor 110 to the basic clock count when a completion condition of a power adjustment is satisfied. Also, if a charging voltage of the charging unit 120 is set to a higher value than a basic charging voltage, the processor 110 may set the charging voltage of the charging unit 120 to the basic charging voltage when a completion condition of a power adjustment is satisfied. Specific examples of a completion condition of a power adjustment are described below with respect to FIGS. 2A to 2C.

The above-discussed adjustments of a charging voltage and of a processor clock count may be applied concurrently or simultaneously, and one of them may be selectively applied.

The charging unit 120 is connected to the charger 180 and the battery 190. The charging unit 120 receives electric power from the charger 180 and provides the charging power to the battery 190 and the device 100. The charging power provided from the charging unit 120 may be used in charging the battery 190 and/or in operating the device 100. The charging unit 120 may raise or reduce a charging voltage under the control of the processor 110. The charging unit 120 provides a basic charging voltage in a normal environment and provides a voltage higher than the basic charging voltage until a completion condition of a power adjustment is satisfied after a booting process is initiated. The charging unit 120 may be realized in the form of an Integrated Circuit (IC), for example.

The charger 180 provides electric power to the charging unit 120. The intensity of current provided to the charging unit 120 may vary according to the type of the charger 180. For example, a charger connected to a USB port may provide a charging current of 500 mA. Also, a charger connected to a power supply of 220V/110V may provide a charging current of 650 mA to 1.7 A. Such values of a charging current are exemplary only and may be varied.

The battery 190 may be charged by the charging unit 120. The battery 190 provides electric power to the device 100 while the battery 190 is not connected to the charger 180.

A detailed operation of elements of the device 100 is described below with respect to FIGS. 2A to 2C.

Figure 2A:
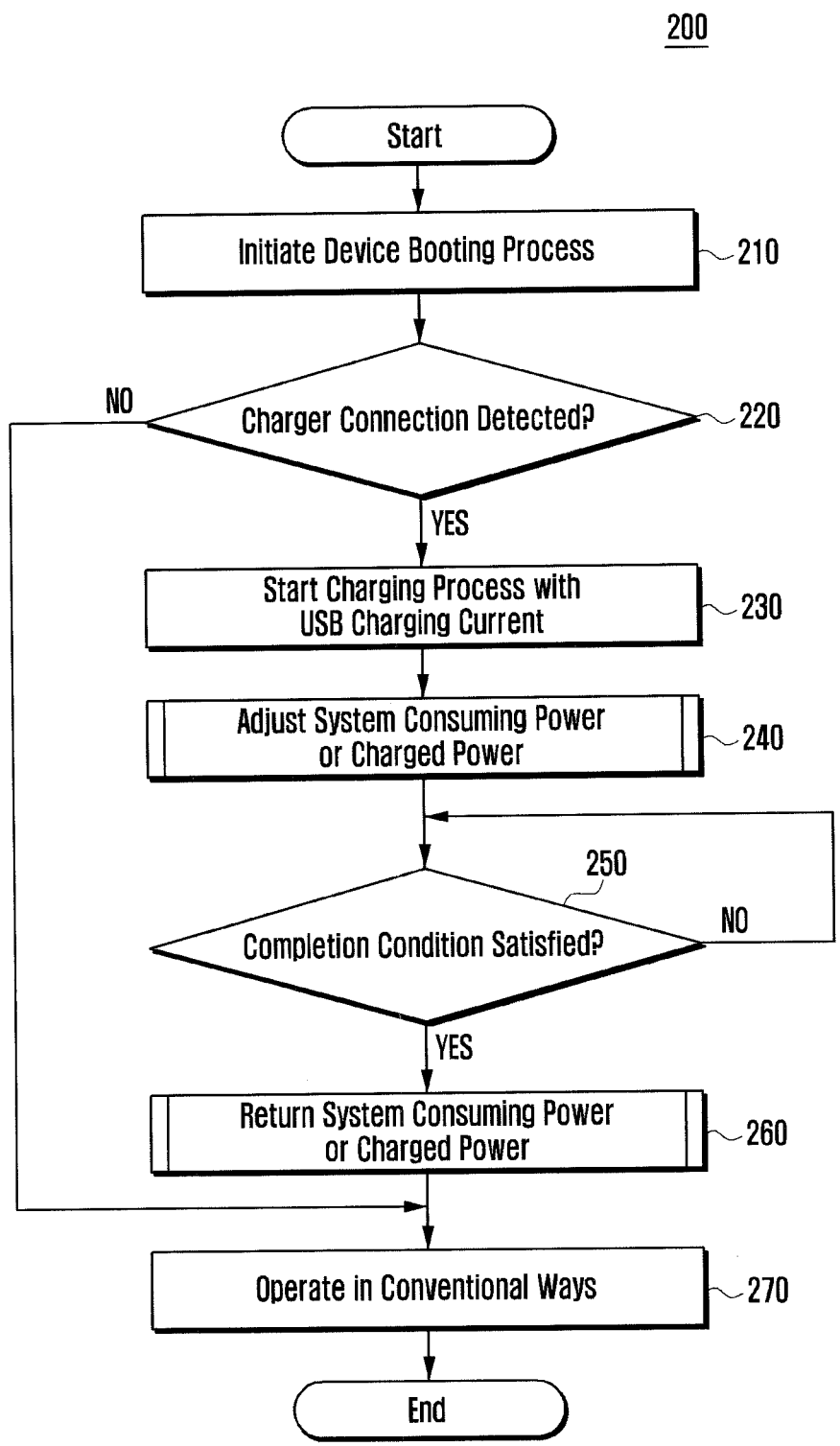
FIG. 2A is a flow diagram illustrating a charging process of a mobile device according to an exemplary embodiment of the present invention.

FIG. 2A is a flow diagram illustrating a charging process 200 of a mobile device 100 according to an exemplary embodiment of the present invention.

Referring to FIG. 2A, in a booting process, the device 100 cannot typically determine whether the battery 190 is over-discharged. The charging process 200 shown in FIG. 2A allows the completion of a booting process and the entrance into a charging mode without any problem even though the battery 190 is over-discharged.

In step 210, a booting process of the device 100 is initiated. For example, when the user presses a power button, a booting process of the device 100 may be initiated. Alternatively, when the charger is connected, a booting process of the device 100 may be initiated accordingly.

In step 220, the processor 110 determines whether the charger 180 is connected to the charging unit 120. The charging unit 120 may detect a connection of the charger 180 and then inform the processor 110 of the connection. If the charger 180 is not connected to the charging unit 120, step 270 is performed according to the related art. Namely, in step 270, the processor 110 is operated with a basic clock count, and a basic charging voltage is used. If the charger 180 is connected to the charging unit 120, step 230 is performed.

In another exemplary embodiment of the present invention, the processor 110 may determine, by itself or with the help of an element other than the charging unit 120, whether the charger 180 is connected to the charging unit 120. For this embodiment, the processor 110 may include a sensor for detecting a connection or receive a sensing signal from such a sensor. According to the exemplary embodiments described herein, it is supposed that the charging unit 120 detects a connection of the charger 180 and the charging unit 120 and delivers detection information to the processor 110.

In step 230, the charging unit 120 begins to charge according to the lowest current (e.g., USB charging current (500 mA)) among charging currents of chargers that can be connected to the charging unit 120. As described above, until a booting process is completed or processed in some degree, the charging unit 120 cannot identify the charger 180 and a charging current. In addition, if the charging unit 120 performs a charging process according to a current higher than a current range provided by the charger 180, a fault may occur in the charger 180. Accordingly, the charging unit 120 begins to charge according to the lowest current among charging currents of chargers connectable to the charging unit 120.

In step 240, the processor 110 adjusts system consuming power and/or charging power. The processor 110 reduces system (device) consuming power and/or raises the charging power so that the system consuming power is not much greater than the charging power.

Figure 2B:
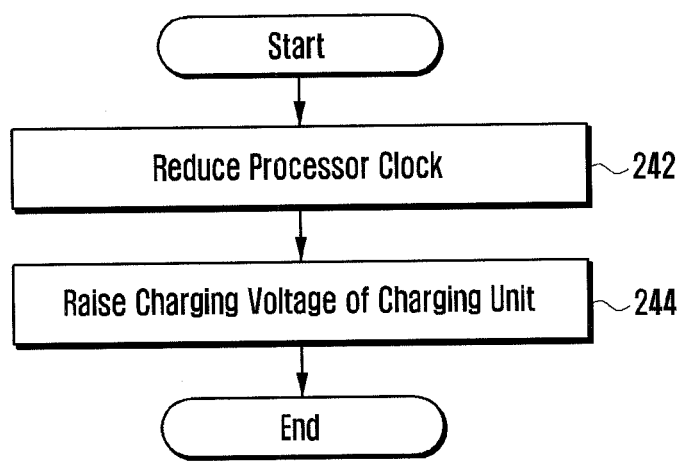
FIG. 2B is a detailed flow diagram illustrating step 240 shown in FIG. 2A according to an exemplary embodiment of the present invention.

FIG. 2B is a detailed flow diagram illustrating step 240 shown in FIG. 2A according to an exemplary embodiment of the present invention.

Referring to FIG. 2B, in step 242, the processor 110 sets a clock count thereof to a smaller value than a basic clock count. This value of the clock count may be determined by a user, a hardware producer, and/or a software provider. When a clock count of the processor 110 is reduced, current consumption of the device 100 is also reduced. Accordingly, it is possible to prevent booting errors or incomplete charging caused by excessive current consumption in comparison with a charging current in a booting process.

In step 244, the processor 110 controls the charging unit 120 to set a charging voltage to a higher value than a basic charging voltage. Normally a basic charging voltage is determined in consideration of the amount of heat generation and the charging efficiency. When a large amount of power is required during a booting process, it may be advantageous to raise a voltage rather than to increase a current in order to meet electric power required during a booting process. Even though the charging efficiency and heat generation problems are sacrificed, a stable booting process is expected. In other words, it is possible to prevent booting errors or incomplete charging which are caused by a failure in meeting electric power required in a booting process.

The above-discussed steps 242 and 244 may be sequentially performed together as shown in this exemplary embodiment of FIG. 2B, or may be performed concurrently and simultaneously. According to another exemplary embodiment of the present invention, only one of the steps 242 and 244 may be performed. Even in this case, the object of the present invention can be accomplished if the charging unit 120 stably provides electric power required in a booting process.

Referring again to FIG. 2A, in step 250, the processor 110 determines whether a completion condition of a power adjustment is satisfied. For example, if the processor 110 determines that the charger 180 connected to the device 100 is a charger providing a charging current over a predetermined threshold value (e.g., 650 mA), the processor 110 may determine that a completion condition of a power adjustment is satisfied. In this case, the charging unit 120 performs a charging process with a high charging current according to a kind of the detected charger. Accordingly, since a charging current is stably provided, it is not necessary to artificially adjust electric power. In another example, when a booting process is completed, the processor 110 may determine that a completion condition of a power adjustment is satisfied. This is because the completion of a booting process allows a detection of battery residual quantity, an identification of the charger 180, and any other complicated power management. In still another example, when the charging unit 120 stably provides sufficient charging power, the processor 110 may determine that a completion condition of a power adjustment is satisfied.

If a completion condition of a power adjustment is not satisfied, the above-discussed step 240 for adjusting power is maintained until a completion condition of a power adjustment is satisfied. When a completion condition of a power adjustment is satisfied, step 260 is performed.

In step 260, the processor 110 returns the system consuming power or the charging power to a basic value. This basic value, as will be described below with respect to FIG. 2C, is consuming power when a clock count of the processor 110 is a basic clock count, or charging power when a charging voltage of the charging unit 120 is a basic charging voltage.

Figure 2C:
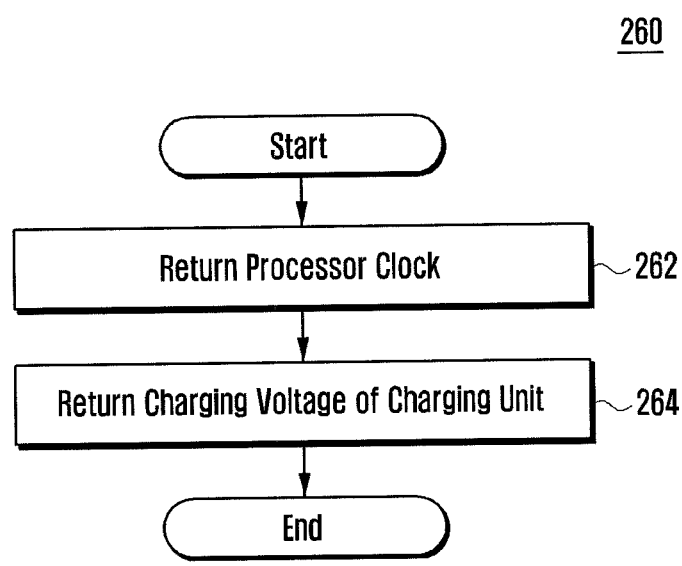
FIG. 2C is a detailed flow diagram illustrating step 250 shown in FIG. 2A according to an exemplary embodiment of the present invention.

FIG. 2C is a detailed flow diagram illustrating step 250 shown in FIG. 2A according to an exemplary embodiment of the present invention.

Referring to FIG. 2C, in step 262, the processor 110 returns a clock count of the processor 110 to a basic value. Since there is no need to suppress consuming power any more, a clock count is returned to a basic value to attain the best performance. In step 264, the processor 110 returns a charging voltage provided from the charging unit 120 to a basic value. Since there is no need to maintain a charging voltage at a high value, a charging voltage is returned to a basic value to improve the charging efficiency and to suppress heat generation.

The above-discussed steps 262 and 264 correspond to the steps 242 and 244 of FIG. 2B, respectively. Accordingly, when one of the steps 242 and 244 is omitted, corresponding one of the steps 262 and 264 may also be omitted.

Referring again to FIG. 2A, in step 270, the device 100 is operated in a conventional way. For example, the device 100 may perform a function of another power management scheme such as controlling display brightness or alerting signs.

Figure 3A:
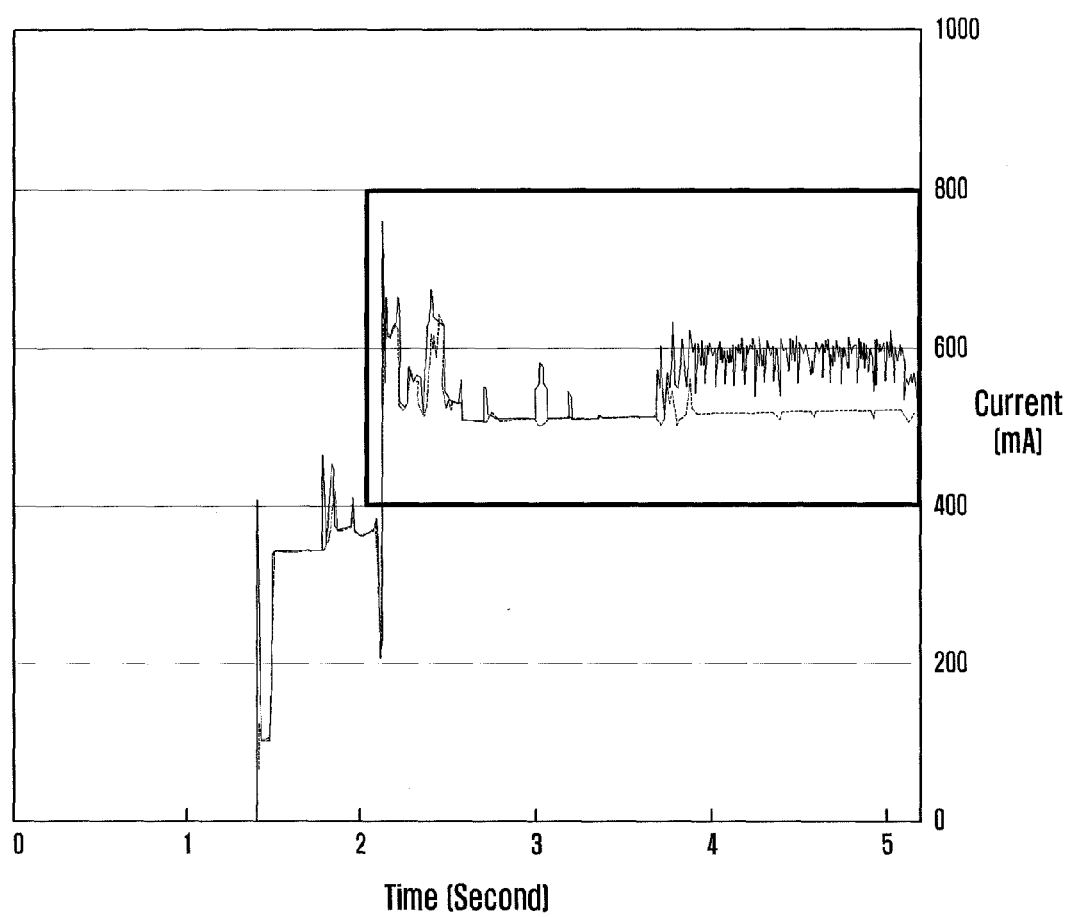
FIGS. 3A and 3B are graphs comparing a current consumption when a processor clock is adjusted according to an exemplary embodiment of the present invention.
Figure 3B:
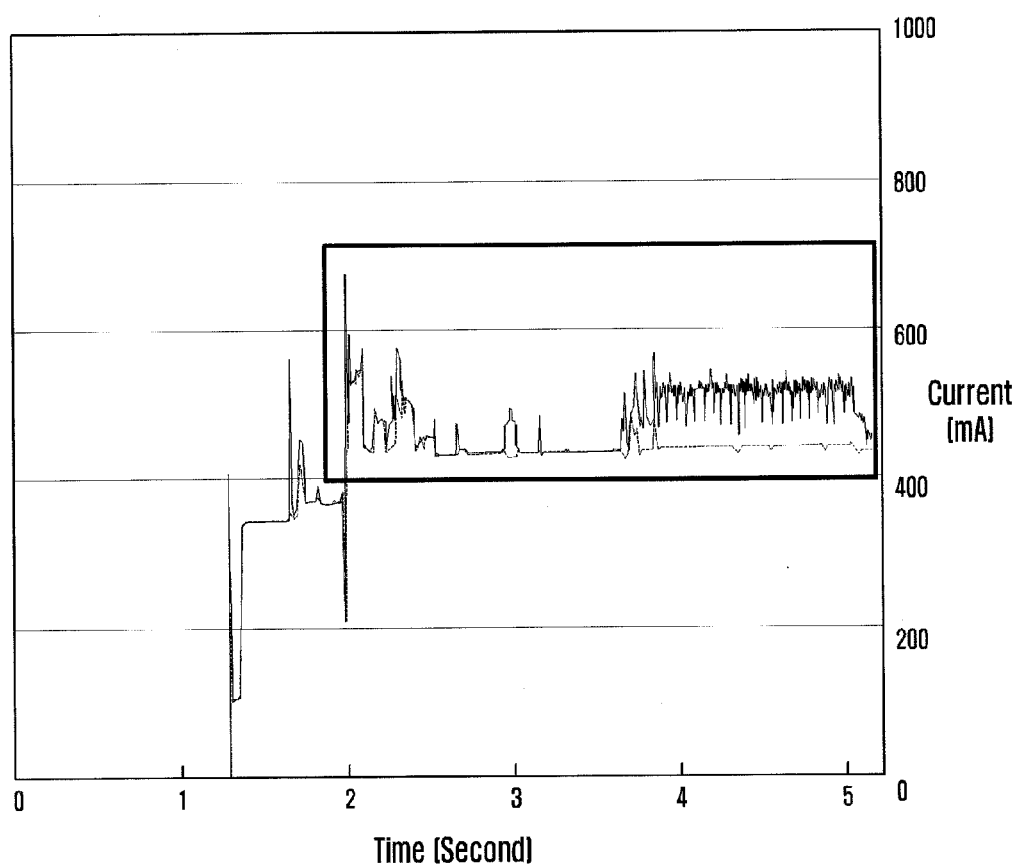

FIGS. 3A and 3B are graphs comparing a current consumption when a clock of a processor is adjusted according to an exemplary embodiment of the present invention.

Referring to FIGS. 3A and 3B, FIG. 3A shows a current consumption when a clock count of the processor 110 is set to a basic clock count, and FIG. 3B shows a current consumption when a clock count of the processor 110 is reduced. A solid line represents a peak current consumption, and a dotted line represents an average current consumption. When a clock count of the processor 110 is reduced, a current consumption is also reduced. Accordingly, the processor 110 can perform stable booting and charging processes by reducing a current consumption.

Figure 4A:
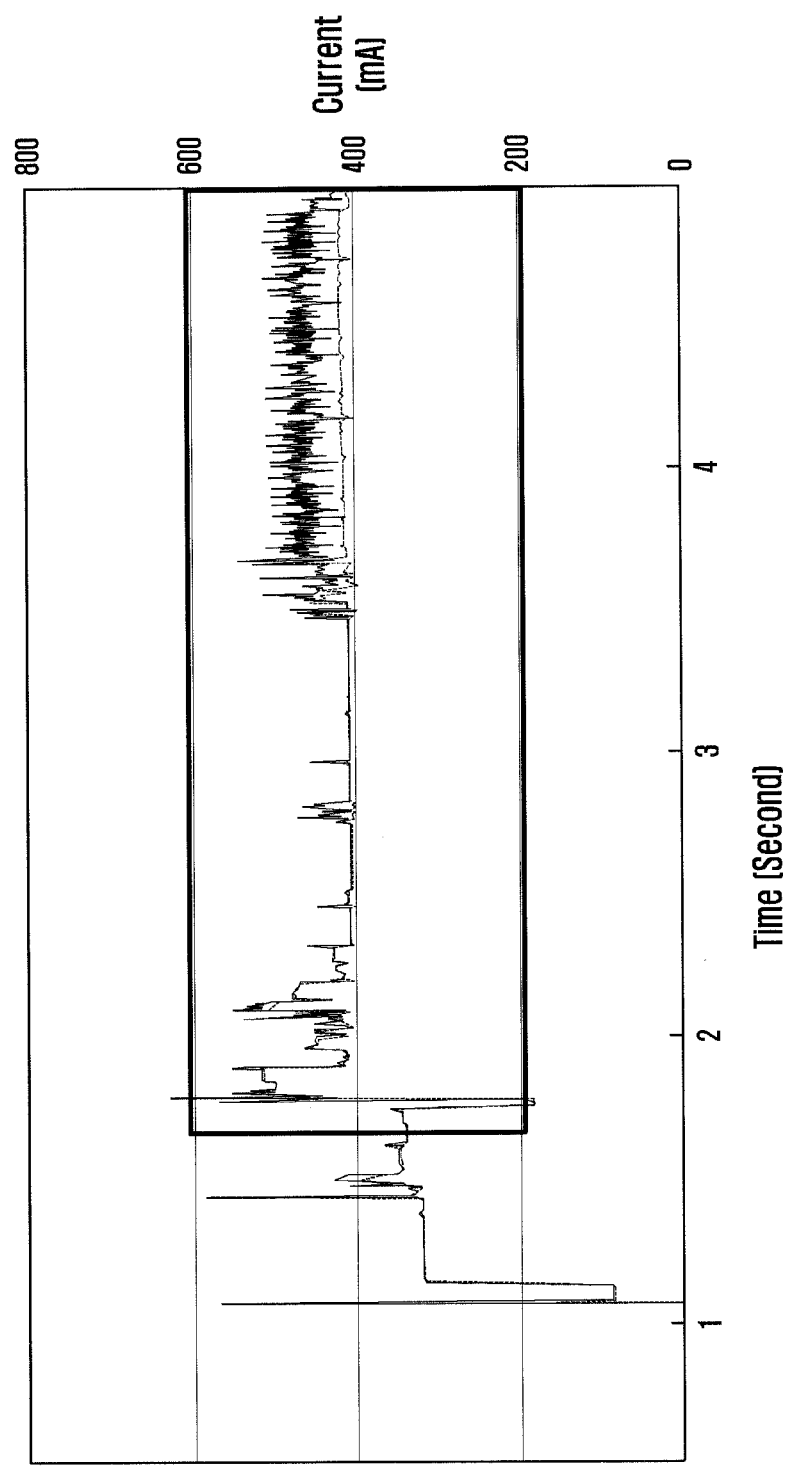
FIGS. 4A and 4B are graphs comparing a current consumption when a charging voltage of a charging unit is adjusted.
Figure 4B:
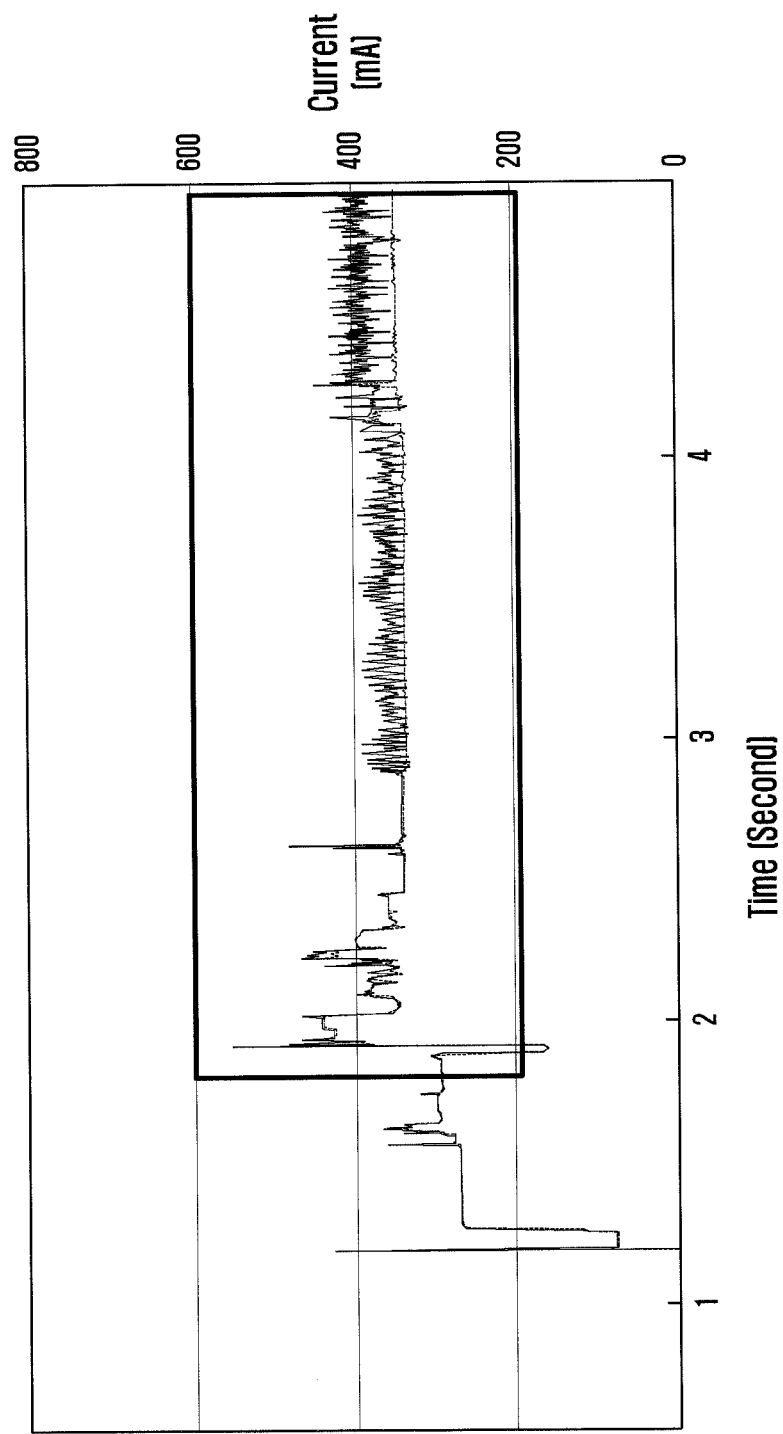

FIGS. 4A and 4B are graphs comparing a current consumption when a charging voltage of a charging unit is adjusted according to an exemplary embodiment of the present invention.

Referring to FIGS. 4A and 4B, FIG. 4A shows a current consumption when a charging voltage of the charging unit 120 is set to a basic charging voltage, and FIG. 4B shows a current consumption when a charging voltage of the charging unit 120 is reduced. A solid line represents a peak current consumption, and a dotted line represents an average current consumption. When a charging voltage of the charging unit 120 is increased, a current consumption is also reduced. In this case, even though a power consumption of the device 100 is unchanged, a current consumption is reduced due to an increase of a voltage. Therefore, the processor 110 can perform stable booting and charging processes by reducing a current consumption.

The present invention is described herein with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, implement the functions specified in the flowchart block or blocks. These computer program instructions may also be stored in a computer usable or non-transitory computer-readable memory that can direct a computer or other programmable data processing apparatus to function in a particular manner, such that the instructions stored in the computer usable or computer-readable memory produce an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The above-discussed mobile device according to an exemplary embodiment of the present invention may include a cellular phone, a smart phone, a PDA (Personal Digital Assistant), a navigation terminal, a digital broadcasting receiver, a PMP (Portable Multimedia Player), and the like.

While this invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. A method for charging a battery of a device, the method comprising:
    starting a charging process when a connection of a charger is detected after a booting process of the device is initiated;
    adjusting electric power by performing at least one of reducing consuming power of the device and raising charging power of the device above a basic charging value; and
    when a completion condition of a power adjustment is satisfied, returning the electric power by performing at least one of returning the reduced consuming power to a basic consuming value and returning the raised charging power to the basic charging value.

2. The method of claim 1, wherein the adjusting of the electric power comprises reducing the consuming power of the device by setting an operation clock count of a processor of the device to a smaller value than a basic clock count of the processor.

3. The method of claim 2, wherein the returning of the electric power comprises returning the operation clock count of the processor to the basic clock count.

4. The method of claim 1, wherein the adjusting of the electric power comprises raising the charging power of the device by setting a charging voltage of the device to a higher value than a basic charging voltage of the device.

5. The method of claim 4, wherein the returning of the electric power comprises returning the charging voltage of the device to the basic charging voltage.

6. The method of claim 1, wherein the returning of the electric power comprises determining that the completion condition of the power adjustment is satisfied when the charger connected to the device is a charger providing a charging current greater than a predetermined threshold value.

7. The method of claim 1, wherein the returning of the electric power comprises determining that the completion condition of the power adjustment is satisfied when the booting process is completed.

8. The method of claim 1, wherein the detecting of the connection of the charger comprises receiving a signal from a sensor detecting the connection of the charger.

9. An apparatus for charging a battery of a device, the apparatus comprising:
    a charging unit for starting a charging process when a connection of a charger is detected after a booting process of the device is initiated; and
    a processor for adjusting electric power by performing at least one of reducing consuming power of the device and raising charging power of the device above a basic charging value, and for, when a completion condition of a power adjustment is satisfied, returning the electric power by performing at least one of returning the reduced consuming power to a basic consuming value and returning the raised charging power to the basic charging value.

10. The apparatus of claim 9, wherein the processor reduces the consuming power of the device by setting an operation clock count of a processor of the device to a smaller value than a basic clock count of the processor.

11. The apparatus of claim 10, wherein the processor returns the operation clock count of the processor to the basic clock count.

12. The apparatus of claim 9, wherein the processor raises the charging power of the device by setting a charging voltage of the device to a higher value than a basic charging voltage of the device.

13. The apparatus of claim 12, wherein the processor returns the charging voltage of the device to the basic charging voltage.

14. The apparatus of claim 9, wherein the processor determines that the completion condition of the power adjustment is satisfied when the charger connected to the device is a charger providing a charging current greater than a predetermined threshold value.

15. The apparatus of claim 9, wherein the processor determines that the completion condition of the power adjustment is satisfied when the booting process is completed.

16. The apparatus of claim 9, further comprising:
a sensor for detecting the connection of the charger,
wherein the processor determines that the charger is connected according to a signal received from the sensor.

17. The apparatus of claim 9, further comprising a battery for providing power to the apparatus while the charger is not connected to the apparatus.

* * * * *